C. R. FEAGAN.
AIR EQUIPMENT FOR AUTOMOBILES.
APPLICATION FILED APR. 4, 1919.
1,347,805.
Patented July 27, 1920.
2 SHEETS—SHEET 1.
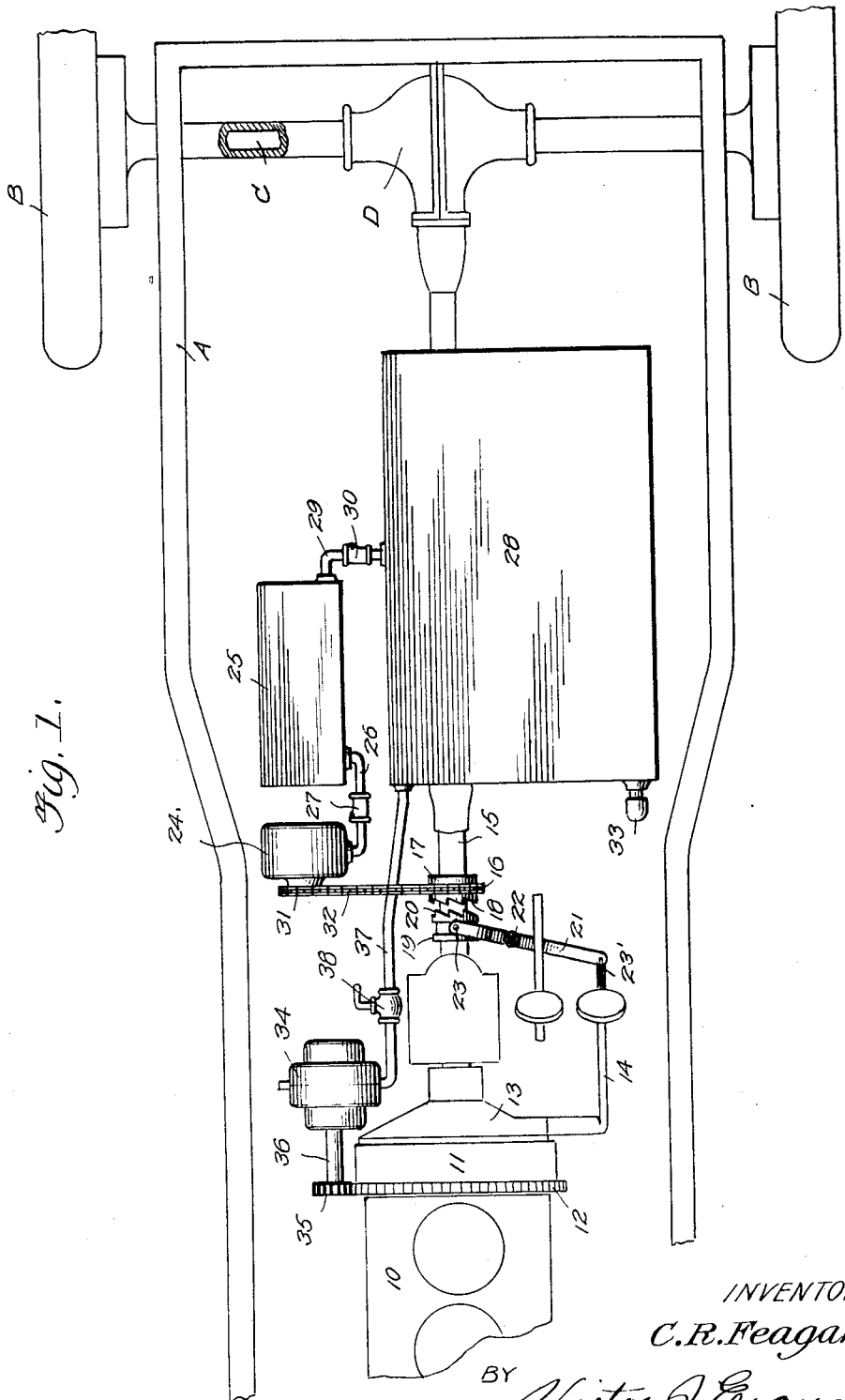
INVENTOR
C. R. Feagan,
BY
Victor J. Evans
ATTY.

C. R. FEAGAN.
AIR EQUIPMENT FOR AUTOMOBILES.
APPLICATION FILED APR. 4, 1919.
1,347,805.
Patented July 27, 1920.
2 SHEETS—SHEET 2.
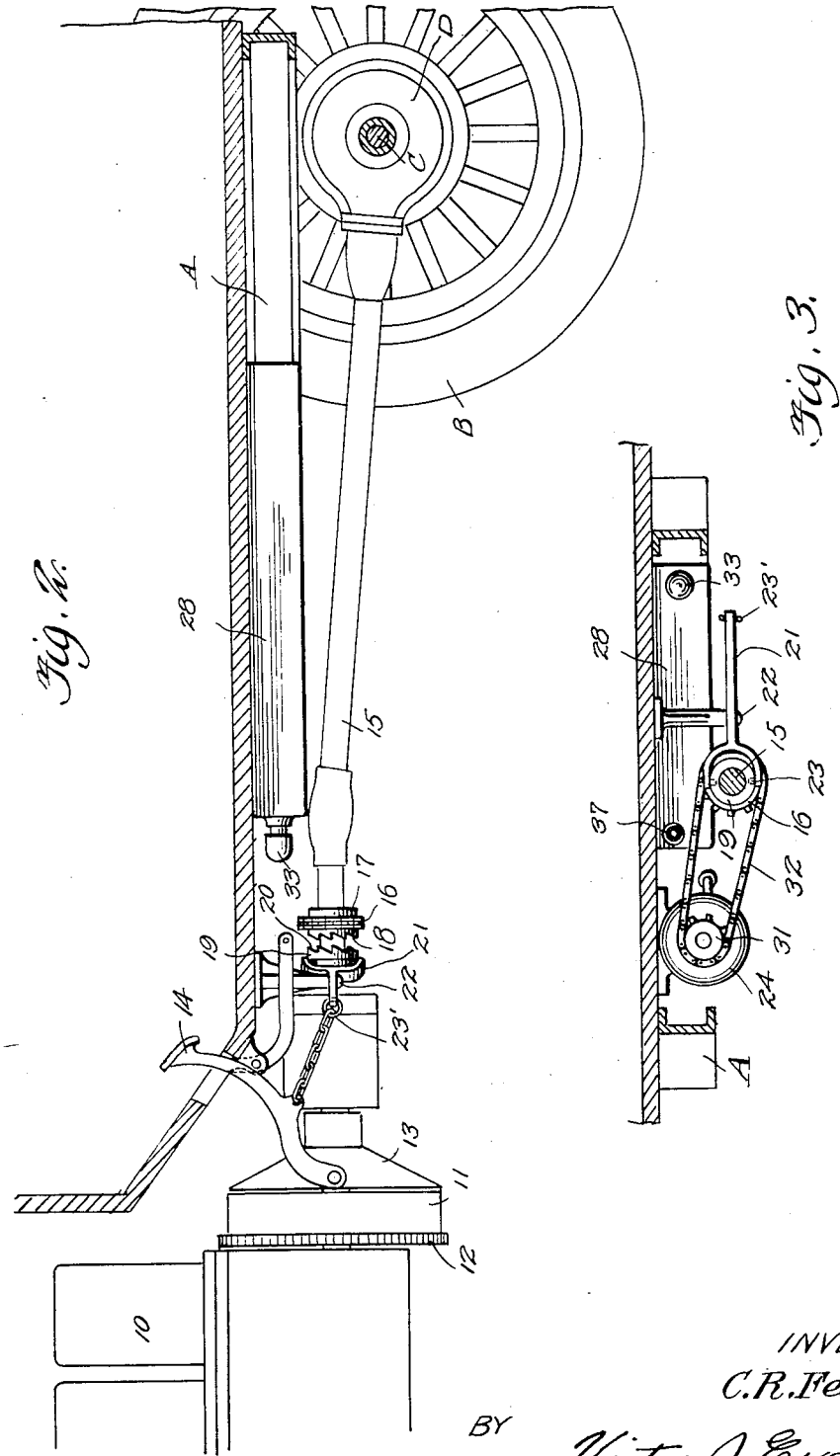
INVENTOR
C. R. Feagan,
BY
Victor J. Evans
ATTY.

UNITED STATES PATENT OFFICE.

CHARLES R. FEAGAN, OF DETROIT, MICHIGAN.

AIR EQUIPMENT FOR AUTOMOBILES.

1,347,805.

Specification of Letters Patent. Patented July 27, 1920.

Application filed April 4, 1919. Serial No. 287,456.

*To all whom it may concern:*

Be it known that I, CHARLES R. FEAGAN, a citizen of the United States, residing at Detroit, in the county of Wayne and State of Michigan, have invented new and useful Improvements in Air Equipments for Automobiles, of which the following is a specification.

This invention relates to automobiles and has particular reference to an apparatus applicable to the same which is adapted to generate and store a supply of compressed air for use in starting the motor.

One of the principal objects of the invention is the provision of a drive shaft, an axle having keyed supporting wheels with a driven connection therebetween, a power plant and a clutch and an apparatus for creating energy, mechanism between the drive shaft and said apparatus for operating the latter, said clutch serving when the power plant is thrown out of operation to render the energy creating mechanism active through inertia of the drive shaft.

Another object in view is the provision of an apparatus of the class described, which derives its supply of energy from a pump operated by the drive shaft after the same has been uncoupled from the motor, thus utilizing the momentum of the car for a source of motive power for said pump.

A further object of the invention is the provision of an apparatus for creating and compressing air within the tank for use in starting the motor, said apparatus being adapted to be operated by the drive shaft through suitable means by the momentum of the car after the power from the motor has been shut off and said compression in the pump reacting as a means to gradually bring the car to a stop, thus not only utilizing the wasted energy and wear on the brake bands but saving fuel now commonly used as a means to compress the air.

Another object of the invention is to provide a device of the class described which includes a high pressure tank and a low pressure storage tank, the high pressure tank having direct communication with the energy creating mechanism, said high pressure tank maintaining a constant pressure at all times, in order to effect an immediate braking action on the drive shaft irrespective of the pressure in the storage tank.

A still further object of the invention is the provision of a combination apparatus acting as a means for compressing air in a storage tank and serving as a brake for the vehicle, said brake equally distributing its force to each of the drive wheels, thus avoiding skidding due to an unequal distribution of the braking power to each wheel, which is not uncommon in vehicles depending entirely upon brake bands.

A further object of the invention is the provision of an apparatus of the class described in which the weight of the same is equally distributed, which is inexpensive to manufacture and which may be readily installed on any standard automobile.

With these and other objects in view the invention resides in a novel construction, combination and arrangement of parts fully described and pointed out in the following description and claims and illustrated in the accompanying drawings in which:

Figure 1 is a plan view of the device applied to in its supplied position.

Fig. 2 is a fragmentary longitudinal sectional view of the same.

Fig. 3 is a detail cross sectional view therethrough.

In the drawings A designates the chassis of an automobile which is provided with the usual drive wheels B keyed to the rear axle C and driven by a differential D. The power plant or motor 10 is provided with a fly wheel 11 having a gear 12 formed on the outer periphery thereof. A clutch mechanism 13, provided with a foot operating lever 14 is interposed between the power plant and a drive shaft 15, the latter being operatively connected with the differential D. Loosely mounted on the drive shaft and keyed against longitudinal movement is a sprocket wheel 16 provided with a hub 17 having a clutch surface 18. A clutch member 19 is splined to the drive shaft 15 adjacent the hub 17 and provided with a clutch surface 20 which is adapted to be thrown into operative engagement with the clutch surface 18 whereby the sprocket wheel 16 is operatively connected with the drive shaft for turning movement therewith. A lever 21 is pivoted at 22 and connected at 23 to the clutch member 19 for moving the same into and out of engagement with the hub 17. The opposite extremity of the lever 21 is connected to the clutch lever 14 as at 23 whereby upon throwing the clutch 13 out of action and thus uncoupling the power plant from the drive shaft, the sprocket wheel 16 is automatically operatively connected with the drive shaft 15. An air pump 24 is connected with a high pressure storage tank 25 by means of a conduit 26 having a check valve 27 arranged therebetween. A low pressure storage tank 28 is connected with the high pressure tank 25 by means of a conduit 29 which is provided with a high pressure check valve 30. The air pump 24 is provided with a sprocket 31 and a sprocket chain 32 operatively connects the sprocket wheels 31 and 16. The main storage tank is provided with a safety valve 33 which relieves the main storage tank of any excess pressure, the escape of the same being adapted to pass out through the muffler from the power plant. A suitable air motor 34 is provided with a gear 35 on its drive shaft 36 and is supplied from the tank 28 by the conduit 37. A valve 38 is arranged in the conduit 37 and is adapted to be operated from the dash board of the vehicle by any suitable means for starting the motor. The gear 35 meshes with the gear 12 on the fly wheel 11 in order to turn over the crank shaft of the power plant.

In operation of the device when the operator of the vehicle throws the clutch 13 out in order to uncouple the power plant from the drive shaft, the clutch surfaces 20 and 18 are automatically engaged by means of the lever 21 thus operatively connecting the sprocket wheel 16 with the drive shaft which revolves through inertia under the momentum of the car and operates the air pump 24 generating a supply of compressing air which is forced into the high pressure tank 25 and subsequently into the low pressure storage tank 28. The resistance necessarily consumed in compressing the air causes the drive shaft 15 to gradually slow down, thus acting as a brake on the rear axle to which the wheels B are keyed. It will thus be seen that the vehicle will be gradually brought to a stand still by the resistance offered in compressing the air and it will be further noted that the momentum of the car will be utilized as a means for storing a supply of compressed air which may be used for starting the motor or any other purpose desired. It might be here noted that the pressure in the high pressure tank 25 always remains constant, irrespective of the pressure in the low pressure storage tank 28, thereby immediately effecting a braking action on the drive shaft when the clutch is thrown to a position to uncouple the drive shaft from the power plant. The usual band brakes may be used in connection with the device for bringing the vehicle to a sudden stop in case of emergency.

While I have shown and described a simple and preferred form of carrying my invention into practice I do not care to be limited to the exact details therein exhibited but reserve the right to make such changes and alteration as necessarily fall within the scope of the appended claims.

What is claimed as new is:

1. In combination, a drive shaft, an apparatus for creating energy, high and low pressure tanks operatively connected with said apparatus for storing energy created by said apparatus and for exerting a retarding influence on said apparatus, mechanism between the drive shaft and said apparatus for operating said apparatus, a power plant, a clutch between the drive shaft and the power plant, and means on the drive shaft serving to couple the energy creating apparatus therewith to render said apparatus active through momentum of the drive shaft when the power plant is thrown out of engagement therewith.

2. A drive shaft, an apparatus for creating energy, high and low pressure tanks operatively connected with said apparatus for storing energy created by said apparatus and for exerting a retarding influence on said apparatus, mechanism between the drive shaft and said apparatus for operating the said apparatus, a power plant, a clutch between the drive shaft and the power plant, and means on the drive shaft serving to couple the energy creating apparatus therewith to render said apparatus active through momentum of the drive shaft when the power plant is thrown out of engagement therewith, an axle having keyed supporting wheels, and a driven connection between the axle and said drive shaft.

3. A driven wheeled axle, a drive shaft operatively connected with said axle, a high pressure tank, a low pressure tank communicating with the same, a compressor operatively connected with the high pressure tank, mechanism between the drive shaft and the compressor for operating the compressor, a power plant, a clutch mechanism between the drive shaft and said power plant, and means coacting with said clutch mechanism serving when the latter is at one adjustment to render the compressor active, to disconnect the drive shaft from the power plant and simultaneously to retard the momental action of the wheeled axle.

4. The combination with a vehicle, having a motor, a drive shaft therefor and a clutch for coupling said motor to the drive shaft, of an apparatus for generating and storing compressed air, comprising a high pressure tank, a low pressure storage tank communicating with the same, an air compressor communicating with the high pressure tank, and means for transmitting motion to said compressor from the drive shaft, said means becoming active upon the operation of the clutch to uncouple the motor from the shaft.

In testimony whereof I affix my signature.

CHARLES R. FEAGAN.